United States Patent [19]
Hasegawa et al.

[11] Patent Number: 6,130,396
[45] Date of Patent: Oct. 10, 2000

[54] ELECTRIC RESISTANCE WELDING SYSTEM

[75] Inventors: Hiroshi Hasegawa; Masatoshi Furukawa, both of Nagoya, Japan

[73] Assignee: Nadex Co., Ltd., Nagoya, Japan

[21] Appl. No.: 09/112,054

[22] Filed: Jul. 9, 1998

[30] Foreign Application Priority Data

Jul. 14, 1997 [JP] Japan ................................ 9-188744

[51] Int. Cl.⁷ .................................................. B23K 11/24
[52] U.S. Cl. ............................................................. 219/110
[58] Field of Search .................................. 219/110, 108, 219/109

[56] References Cited

U.S. PATENT DOCUMENTS

| | | |
|---|---|---|
| 3,389,239 | 6/1968 | Treppa et al. ............................ 219/110 |
| 4,028,522 | 6/1977 | Chihoski et al. . |
| 4,302,653 | 11/1981 | Denning et al. . |
| 4,329,561 | 5/1982 | Schafer et al. . |
| 4,343,980 | 8/1982 | Stanya et al. ............................ 219/110 |
| 4,419,560 | 12/1983 | Zurek . |
| 4,442,337 | 4/1984 | Nakata et al. . |
| 4,447,700 | 5/1984 | Cohen . |
| 4,456,810 | 6/1984 | Schumacher et al. . |
| 4,484,056 | 11/1984 | Rossell . |
| 4,503,311 | 3/1985 | Houchens et al. . |
| 4,542,277 | 9/1985 | Cecil . |
| 4,678,887 | 7/1987 | Nagel et al. . |
| 4,694,135 | 9/1987 | Nagel et al. . |
| 4,711,984 | 12/1987 | Bilge et al. . |
| 4,792,656 | 12/1988 | Namiki et al. . |
| 4,861,960 | 8/1989 | Haefner et al. . |
| 4,963,707 | 10/1990 | Zyokou et al. . |
| 5,081,338 | 1/1992 | Dufrenne . |
| 5,111,020 | 5/1992 | Stiebel . |
| 5,343,011 | 8/1994 | Fujii et al. . |
| 5,347,105 | 9/1994 | Kawai . |
| 5,386,092 | 1/1995 | Dufrenne . |
| 5,440,092 | 8/1995 | Kawai . |
| 5,471,028 | 11/1995 | Kawai . |
| 5,483,035 | 1/1996 | Kawai et al. . |

FOREIGN PATENT DOCUMENTS

| | | |
|---|---|---|
| 57-146485 | 9/1982 | Japan . |
| 58-181488 | 10/1983 | Japan . |
| 2-84276 | 3/1990 | Japan . |

*Primary Examiner*—Clifford C. Shaw
*Attorney, Agent, or Firm*—Dennison, Scheiner, Schultz & Wakeman

[57] ABSTRACT

A predetermined value is used for adjusting welding power to an optimum value to consistently achieve sturdy welds. The predetermined value is not affected by variations in workpiece materials and in wear of electrodes. Preferably, total power per unit volume of the workpieces is used as the predetermined value. In a resistance welding system, total power per unit volume required to satisfactorily weld the workpieces is calculated from a total thickness of the workpieces and a welding time. From this calculated total power per unit volume, power per unit volume and per unit time is calculated. The present welding system adjusts one of the welding current or the welding voltage to an optimum value required to produce the predetermined value.

14 Claims, 3 Drawing Sheets

ELECTRIC RESISTANCE WELDING SYSTEM

BACKGROUND OF THE INVENTION

1. Field of the Invention

The present teachings relate to a technique for welding workpieces by employing electric resistance heating caused by conducting electric current through the workpieces.

2. Description of the Related Art

Known welding systems of this type generally comprise a pair of electrodes for retaining workpieces therebetween, an electric power source for generating a welding current that can be conducted through the workpieces by the pair of electrodes, and a controller for controlling the electric power source and the current generated thereby. In order to produce a sturdy weld, the welding power must be controlled. If the welding power applied to the workpieces is too great, the weld site may spatter and thereby prohibit a sturdy weld. On the other hand, if the welding power is too small, insufficient heating at the weld site reduces the weld quality. Previously, welding power has been controlled by adjusting either welding current or welding voltage.

Various kinds of predetermined values have been utilized to control the amount of power that is applied to the weld site. For example, welding current generally is used as suchapredetermined value. In this case, the welding current is monitored and increased if it is too little to produce a sturdy weld. The welding current is reduced if the welding power is too great to prevent overheating of the workpiece.

However, various kinds of workpieces must be welded and an optimum value or a standard predetermined value depends upon the composition of the workpiece materials, including whether the workpieces are coated or not. In known welding techniques, when the welding current is used as the predetermined value, predetermined welding current values may be too great or too little as a result of variation in workpiece compositions. Therefore, a standard predetermined current value must be determined independently for every kind of workpieces that will be welded. In application of these known welding techniques, the determination of the standard current value typically requires a large number of experiments.

Further, even when the standard value of the predetermined value has been predetermined based upon experimental results, compensation for the standard value must be provided as welding operations progress, because the resistance of the welding electrodes usually changes after repeated welding operations. Once the electrodes have been worn, a sturdy weld can not be made simply by controlling the welding current based on the standard value that was determined before the electrodes were worn by repeated welding operations. Thus, the determination of a technique for compensating for the standard value in compliance with wear of the electrodes also has been known to require a large number of experiments.

SUMMARY OF THE TEACHINGS

It is, accordingly, an object of the present teachings to provide a predetermined value for welding workpieces that is not affected by variations in workpiece materials and in the wear of electrodes so as to thereby avoid the necessity of compensating for variations in workpiece materials and in the wear of the electrodes. When such a predetermined value is used, sturdy welds can be made consistently by monitoring the predetermined standard value.

According to the present teachings, a total power per unit volume of the workpieces is used as the predetermined value. Throughout this description, power is intended to mean power for resistive heating of workpieces and the amount of the power is shown by $V \cdot I$ ($=I^2R$). By predetermining the total power that is necessary to produce a sturdy weld and then applying the same total amount of power per unit volume to each weld site for a given workpiece composition, sturdy welds can be consistently made regardless of variations in workpiece materials and in wear of electrodes. After conducting various experiments in which values of the total power per unit volume of the workpieces were changed, it was confirmed that sturdy welds could be made regardless of variations in the workpiece materials and in wear of the electrodes, when the total power per unit volume is applied to the workpieces within a predetermined range.

Because the contact area between the electrodes and the workpiece varies as the electrode is worn, it was previously considered to be difficult to calculate a single predetermined total power per unit volume value for workpieces that could be utilized for the life of the electrodes. However, according to the present teachings when the conducting cross section of the workpieces changes due to variation of the contact area of the electrode with the workpieces, the welding power applied to the workpieces also changes in accordance with the change in contact area. But, after making certain calculations, these changes can be made to cancel out and not be relevant to the predetermined total power value that is applied to the workpieces. As a result, the preferred total power per unit volume of the workpieces does not vary as the contact area of the electrode with the workpiece changes due to wear.

Thus, the total power per unit volume is used as the predetermined value to control the welding power according to the present teachings. Once a predetermined standard value for the predetermined value is determined that yields sturdy welds for a particular workpiece material, this predetermined standard value yields sturdy welds regardless of variations in the workpiece materials and in wear of the electrodes, thereby permitting sturdy welds to be obtained consistently.

In a first preferred aspect of the present teachings, the total power per unit volume of the workpieces is calculated based upon the combined thickness of the workpieces that will be welded and the time necessary to produce a sturdy weld. Variations in the workpiece materials and in wear of the electrodes are generally not relevant to the present calculations. Most workpieces then can be satisfactorily welded utilizing this technique.

In a further preferred aspect, power per unit volume and per unit time during the welding period is calculated according to a model in which the weld power is set to be a first value during the first half of the welding period and a second lower value during the last half of the welding period. By adjusting the power per unit volume and per unit time to be relatively high during the first half of the welding period, the temperature of the workpiece can be raised in a short time, thus permitting a short time welding. In addition, by reducing the power during the last half of the welding period, overheating of the workpieces can be prevented, thereby ensuring that a sturdy weld results. Thus, in this preferred aspect, the required total power per unit volume can be applied to the workpieces in a relatively short period of time.

In a second aspect of the present teachings, the power per unit volume applied to the workpieces during the welding period is measured. This measured value can then be compared to the value calculated according to the first aspect to determine whether a sturdy weld has been made or not.

As a result, weld quality can consistently be determined without consideration of variations in workpieces materials and in wear of the electrodes. Thus, the present teachings permit weld defects to be easily and accurately identified.

DETAILED DESCRIPTION OF THE PREFERRED EMBODIMENTS

A preferred example for calculating power "Q" per unit volume according to the present teachings will now be described. For easy reference, the following symbols will be utilized throughout this description:

"t" represents the total thickness of a pair of workpieces;

"r" represents the electric resistivity of the workpieces;

"V" represents the inter-electrode voltage that is applied to the workpieces;

"I" represents the welding current that is conducted through the workpieces; and "S" represents the contact area of the electrodes with the workpiece.

In this case, the welding current flows through a cross-section of the workpieces that is columnar in shape and has the cross-sectional area "S" and the resistance of the workpieces in that cross-section causes heating therethrough when the current is applied. Power "q" per unit volume and per unit time applied the columnar portion of the workpieces can be calculated by the following equation:

$$q=(V \cdot I)/(S \cdot t) \qquad (1).$$

Further, the electric resistance R of the columnar portion is obtained by the following equation:

$$R=(r \cdot t)/S \qquad (2).$$

When solving equation (2) by substituting the relationship of S to R, r and t into equation (1), the following relation is yielded:

$$q=(V \cdot I \cdot R)/(r \cdot t^2)=(V^2)/(r \cdot t^2) \qquad (3).$$

Thus, power (q) per unit volume and per unit time can be calculated based upon the inter-electrode voltage V and the total thickness t of the workpieces and therefore, this value is not affected by the contact area S of the electrode with the workpiece.

Those skilled in the art will recognize that in equation (3), power q is calculated based upon the inter-electrode voltage V. However, power q also can be calculated based upon the inter-electrode current I, by substituting V=I·R into equation (3). Also, as noted above, the contact area S of the electrode with the workpiece is not relevant to the calculation of the power per unit volume per unit time or to the total power Q per unit volume that is applied to the workpieces.

In the present teachings, the total power Q per unit volume is used as a predetermined value. This value is calculated by adding the power q that is applied in each unit of time during the entire welding period. The total welding power that is applied to the workpieces is adjusted based on the predetermined value.

Figure 1:
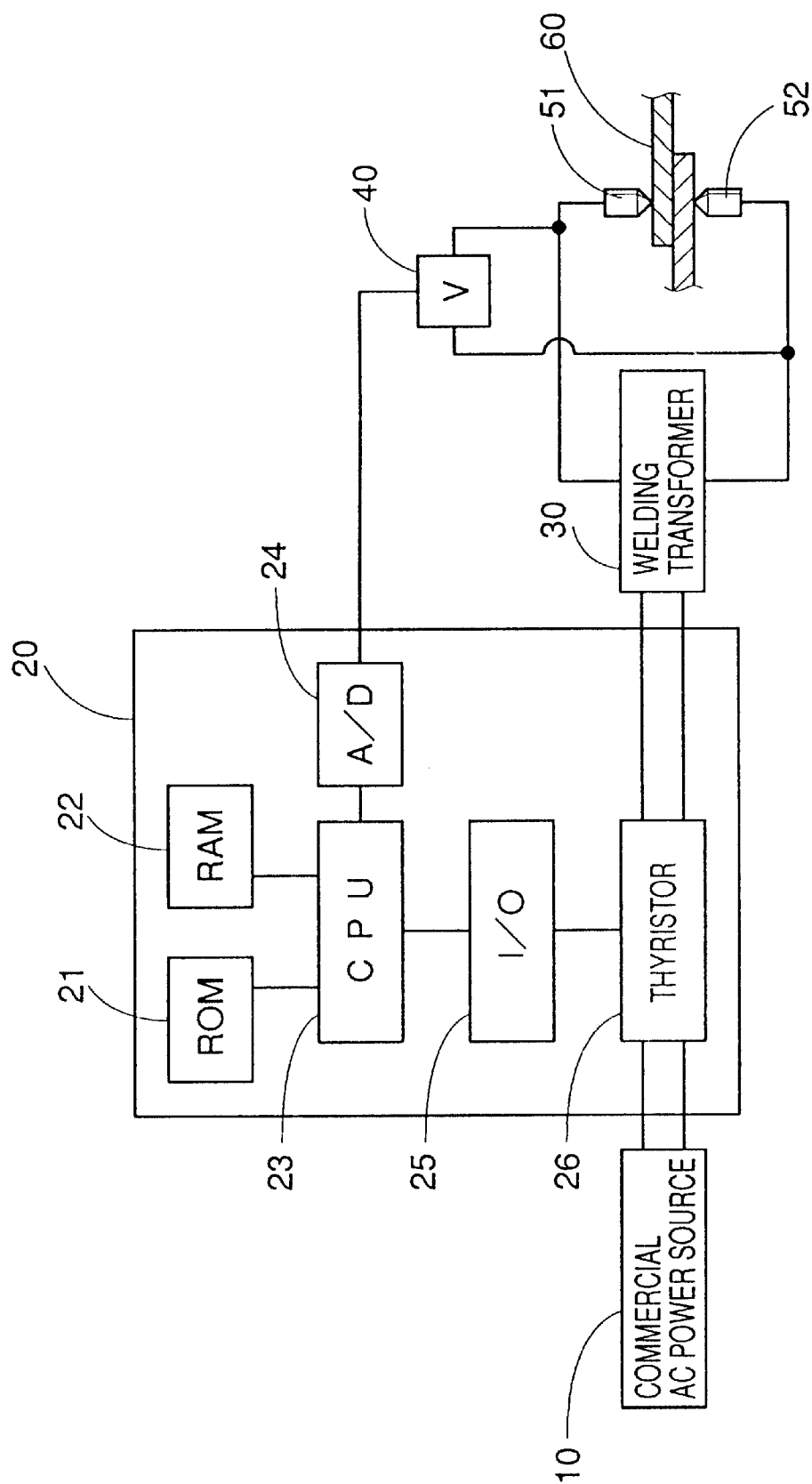
FIG. 1 is a block diagram showing a preferred embodiment of a resistance welding system constructed according to the present teachings.

A first embodiment of the present teachings will now be described. FIG. 1 is a view showing an overall construction of a resistance welding system that can be utilized with a commercial power source 10. A thyristor 26 is provided for changing the welding current by adjusting a firing angle, which means the phase of the AC power supply in which an "on" signal is applied to the thyristor. Welding current adjusted by the thyristor 26 is transformed by a welding transformer 30 to a welding power of low voltage and large current. The welding current is then conducted across workpieces 60 that are held between a pair of electrodes 51 and 52. A clamping force provided to hold the workpieces 60 between the pair of electrodes 51 and 52 can be regulated by a variety of means known in the art. A large current is preferably conducted across the workpieces 60 to cause electric resistance heating of the workpieces 60, which resistance heating permits welding of the workpieces 60.

The voltage across the pair of electrodes 51 and 52 is measured by a voltmeter 40. The measured voltage preferably is converted to a digital signal by an A/D converter 24 and then inputted into a CPU 23. The CPU 23 may operated according to a control program stored in a ROM 21 such that power per unit time (in the present embodiment, a cycle is the unit of time) and per unit volume can be adjusted by controlling the firing angle of the thyristor. Preferably an input/output interface 25 is provided for firing the thyristor 26 by a firing signal outputted from the CPU 23.

A RAM 22 may be used to temporally store various kinds of data. The control program stored in the ROM 21 serves to execute an operation process shown by a flowchart of FIG. 2. This process is executed when the welding operation is performed.

Those skilled in the art will recognize that the present teachings can be utilized with an analog signal processing system or a mixed analog/digital signal processing system. The particular circuits and techniques for achieving the present teachings can be greatly modified from the preferred embodiment without departing from the spirit of the invention.

A representative control program for perform conducting a welding operation according to the present teachings will now be described with reference to the flowchart of FIG. 2.

First, in step S1, the total power Q per unit volume required to satisfactorily weld the workpieces is calculated based upon the total thickness t and the total amount of time that the welding operation will proceed, which in this case is the total number of welding cycles c of the commercial AC power 10.

Based upon experiments in which the types of workpieces and the total thickness of the workpieces were changed, the total power Q per unit volume required to produce sturdy welds can be determined based upon the total thickness of the workpieces and the welding time (the number of welding cycles c):

$$Q=Q_0+k \cdot c/t \qquad (4),$$

wherein c is the number of welding cycles, t is the total thickness of the workpieces, $Q_0$ is a constant preferably ranging between 1–100 J/mm$^3$ and k is a coefficient preferably ranging between 0–10 J/c·mm$^2$). Preferably, when the workpiece is made of iron, Q=9 J/mm$^3$ and k=2.6 J/(c·mm$^2$).

In this case, a value of the coefficient k may be indicated by the ratio resistive heating power/(welding period·mm²).

According to the experimental result obtaining based on these teachings, when the total power Q is adjusted to a predetermined value obtained from equation (4), sturdy welds are consistently made, regardless of variables such as workpiece materials, presence or absence of the coated layer, materials of the coated layer, wear of the electrodes 51 and 52, and magnitude of the clamping force between the electrodes 51 and 52. Previously, welding power was controlled by a phenomenon that occurs in a unit time basis. For example, welding current has been selected as the predetermined value for controlling the welding power. In contrast, according to the present teachings, total power is used as the predetermined value in place of phenomenon occurred in a unit time basis. This change enables sturdy welds to be consistently made regardless of variations in workpiece materials and in wear of the electrodes.

Those skilled in the art will recognize that equation (4) is preferred example for expressing the calculation that are utilized according to the present teaching and that other approximation equations for obtaining an optimum value for Q may be utilized without affecting the results obtained. In addition, the optimum value for Q may be calculated from a prepared table in which the value Q can be located by the total thickness of the workpieces and the welding time.

Figure 2:
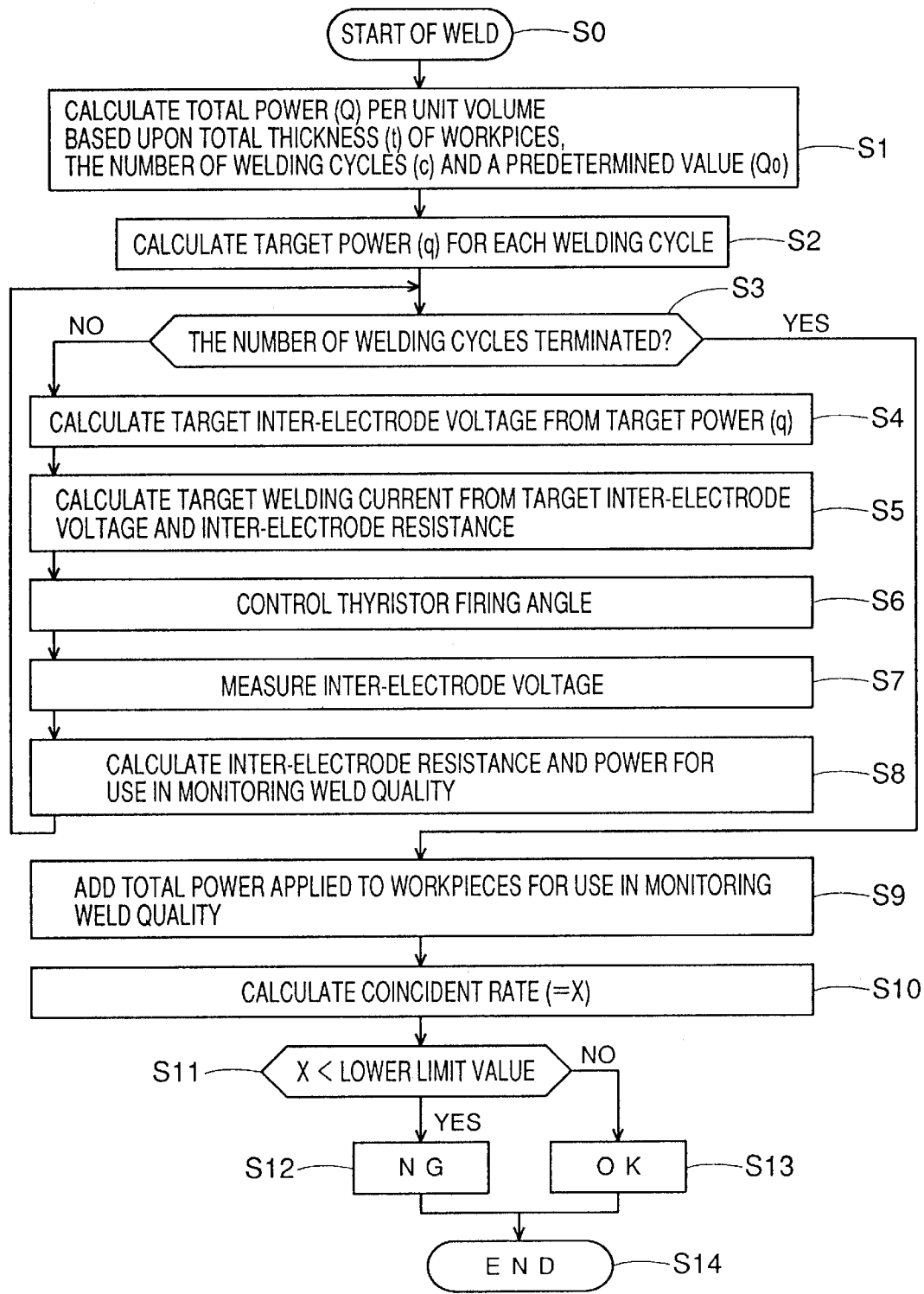
FIG. 2 is a flowchart showing processing steps that may be executed according to the preferred embodiment.

In step S2 of FIG. 2, power q per cycle is calculated to ensure that the desirable total power Q calculated in step S1 is applied to the workpieces.

Figure 3:
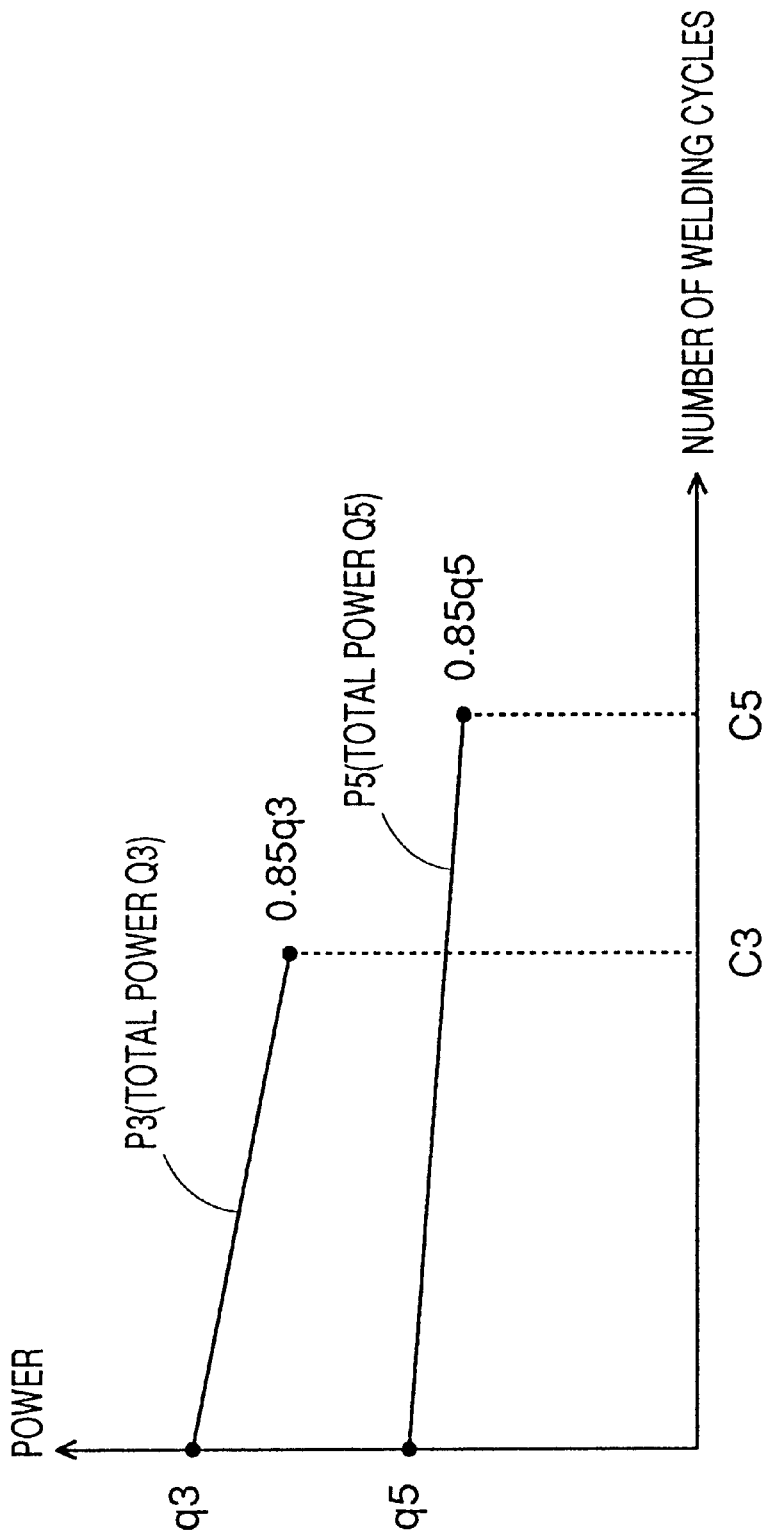
FIG. 3 is a graph showing examples of the relationship between the processing steps and cycle-by-cycle power with respect to the total power.

FIG. 3 illustrates a preferred relationship between the number of welding cycles and amount of power q applied to the workpieces during each cycle. Generally speaking, the number of welding cycles depends on the total thickness of the workpieces. That is, a thin workpiece may only require a short welding time, while a thick workpiece may require a long welding time.

In FIG. 3, C3 designates a preferred number of welding cycles when the total thickness of the workpieces is 3 mm, and C5 designates a preferred number of welding cycles when the total thickness of the workpieces is 5 mm. Line P3 illustrates a preferred cycle-by-cycle variation of power q that may be utilized to achieve the desired total power Q3 when the total workpiece thickness is 3 mm.

In an initial cycle, a first amount of power q3 is applied. Over the course of welding the workpieces, the amount of power applied in each cycle is gradually reduced until about 85% of the initial power is applied during the final welding cycle. Value Q3 designates total power calculated by adding the power q that is applied to the workpieces in each of the C3 cycles.

Similarly, Line P5 and total power Q5 are shown in FIG. 3 for a workpiece having a thickness is 5 mm. Again, over the course of welding the workpieces, the amount of power applied in each cycle is gradually reduced until about 85% of the initial power is applied during the final welding cycle. Value Q5 designates total power calculated by adding the power q that is applied to the workpieces in each of the C5 cycles.

Preferably, the initial value of the power q is set to be a relatively large value and is gradually reduced in the following cycles. However, those skilled in the art will recognize that the power q may be held constant in each welding cycle. As noted above, the final value of q is set to be 85% of the initial value in this preferred embodiment, which has the advantageous feature of producing strong welds while simultaneously shortening the welding time and substantially reducing the possibility of weld spattering.

Step S3 of FIG. 2 serves to determine whether the welding operation can be terminated. Preferably, the number of the welding cycles is counted during the welding operation, and the welding operation is terminated when the number of cycles reaches a predetermined value, such as is shown by C3 or C5 in FIG. 3.

Until the desired number of cycles is reached, NO is selected and step S4 is executed. Step S4 serves to calculate the inter-electrode voltage V required to yield the desired power q per cycle (unit time) and per unit volume that was calculated in step S2 by using equation (3). In equation (3), unit time is seconds. However, power q per cycle is illustrated in FIG. 3. Therefore, it should be noted that the same unit time must be used when calculating the inter-electrode voltage V.

Step S5 serves to calculate the welding current I required to yield the inter-electrode voltage V calculated in step S4. Subsequently, a firing angle for realizing the welding current I is calculated so that the thyristor 26 may be excited and fired at the calculated firing angle (step S6). By executing step S6, welding current is controlled so as to be identical to the desired current calculated in step S5.

Instep S7, the inter-electrode voltage V is measured. The inter-electrode resistance and power per unit volume and per unit time (each cycle) for use in monitoring are calculated using the measured voltage from step S7 and the current value I previously calculated in step S5. The inter-electrode resistance calculated in step S8 will be used to calculate the current I from the voltage V in step S5 of the next cycle of the welding operation.

Steps S4 to S8 are repeated for every cycle, and when the number of welding cycles shown by C3 or C5 in FIG. 3 is terminated, step S3 proceeds to YES and the welding operation is terminated. After the termination of the welding period, step S9 is executed, and the power calculated in step S8 for use in monitoring is totaled.

Steps S10 and S11 serve to evaluate the welding results. In step S10, the total value of the power that was applied to the workpieces and was calculated in step S9 is divided by the predetermined value for the total power Q that was calculated in step S1. When the value determined in step S10 (referred to as coincident rate X) exceeds a lower limit value that is slightly lower than 1.0, the predetermined value for the total power has been applied to the workpieces. If so, an OK step is executed, and the process is terminated.

However, if the coincident rate X is below the lower limit value, the required total power has not been applied to the workpieces. Therefore, an NG (not good) step is executed and the process is terminated. In this case, the workpieces must be evaluated to determine whether a sturdy weld has been achieved.

According to the above-described embodiment, the welding power is controlled based upon the predetermined value representing the total power per unit volume of the workpieces (corresponding to Q3 or Q5 obtained by integrating line P3 or P4 of FIG. 3). Therefore, the standard value can be set regardless of variations in workpiece materials or in wear of the electrodes, permitting study welds.

In addition, the power per unit time preferably is gradually reduced cycle-by-cycle, thus permitting a rapid rise of the workpiece temperature at the beginning of the welding operation as well as prohibiting excessive heating at the end of the welding operation. Thus, sturdy welds can be made in a short period of time.

Further, by evaluating the weld results based upon the total power per unit volume that was actually applied to the workpiece, a high quality evaluation can be made regardless of variations in workpiece materials and in wear of the electrodes.

While the teachings has been described with reference to preferred embodiments thereof, it is to be understood that modifications or variations may be easily made without departing from the scope of the present teachings which is defined by the appended claims.

We claim:

1. A resistance welding system comprising:

a pair of electrodes for gripping workpieces therebetween;

an electric power source for generating a welding current comprising a plurality of cycles that is conducted across said workpieces by said pair of electrodes;

a controller for controlling said electric power source and executing a welding operation process, and, means for adjusting one of a welding current and a welding voltage based on a sensed voltage between said pair of electrodes between welding cycles to a value required to apply a predetermined power per unit time and per unit volume so that a predetermined total power per unit volume is applied to the workpiece that will be welded.

2. The resistance welding system as defined in claim 1, wherein said means for adjusting one of a welding current and a welding voltage includes means for calculating said predetermined total power per unit volume based upon a total thickness of the workpieces and a total welding time.

3. The resistance welding system as defined in claim 1, wherein said means for adjusting one of a welding current and a welding voltage includes means for holding said power per unit volume per unit time relatively high during a first half of a welding operation process, and relatively low during a last half of the welding operation process.

4. The resistance welding system of claim 1 wherein said means for adjusting one of a welding current and a welding voltage gradually reduces the power per unit volume and per unit time during the welding operation process.

5. A resistance welding system comprising;

a pair of electrodes for holding workpieces therebetween;

an electric power source for generating a welding current that is conducted across said workpieces by said pair of electrodes; and a controller for controlling said electric power source and executing a welding operation process, means for measuring a total energy per unit volume applied to the workpieces during a welding period; and means for comparing said measured total energy value and a predetermined total energy value.

6. A resistance welding system as in claim 5 further comprising:

means for calculating a predetermined total energy per unit volume of the workpieces required to satisfactorily weld said workpieces, the calculation being based upon a total thickness of said workpieces and a total welding time.

7. A method for resistance welding comprising the steps of:

providing a pair of workpieces;

providing a pair of electrodes;

gripping said workpieces with said electrodes;

connecting an electric power source to said electrodes;

executing a welding operation process by generating an electric current across said electrodes and adjusting one of the welding current and the welding voltage to a value required to apply a predetermined power per unit time per unit volume in a series of steps so that a predetermined total energy per unit volume is applied to said workpieces said value based on the voltage between said workpieces between said steps.

8. The method of claim 7 including the step of calculating said predetermined power per unit volume based upon a total thickness of the workpieces and a total welding time.

9. The method of claim 7 including the step of calculating said energy per unit volume and per unit time in accordance with a table in which said energy per unit volume per unit time is relatively high during a first half of a welding operation process, and relatively low during a last half of the welding operation process.

10. The method of claim 7 including the step of gradually reducing the energy per unit volume and per unit time during the welding operation process.

11. A method for resistance welding comprising the steps of:

providing a pair of workpieces in contact with one another, each having a thickness and being comprised of a material;

providing a pair of electrodes;

gripping said workpieces with said electrodes;

connecting an electric power source to said electrodes;

determining a total power per unit volume for a weld based on said material and the thickness of said pair of workpieces;

determining a number of welding cycles based on the thickness of said pair of workpieces;

applying a first predetermined power per unit volume to said workpieces;

measuring the voltage between said electrodes;

adjusting said power source based on said measured voltage and applying a second predetermined power per unit volume;

repeatedly measuring the voltage, adjusting said power source based on said measured voltage and applying subsequent predetermined amounts of power per unit volume until said number of welding cycles has been completed.

12. The method of claim 11 wherein said first predetermined amount of power per unit volume is greater than said subsequent predetermined amounts of power per unit volume.

13. The method of claim 12 wherein each predetermined amount of power per unit volume is less than or equal to the preceding predetermined amount of power per unit volume.

14. The method of claim 11 including the additional step of summing the applied amounts of power to obtain a sum, comparing said sum with said predetermined total power per unit volume, and generating an error signal when said sum differs from said predetermined total amount of power by a given amount.

* * * * *